United States Patent Office 2,703,936
Patented Mar. 15, 1955

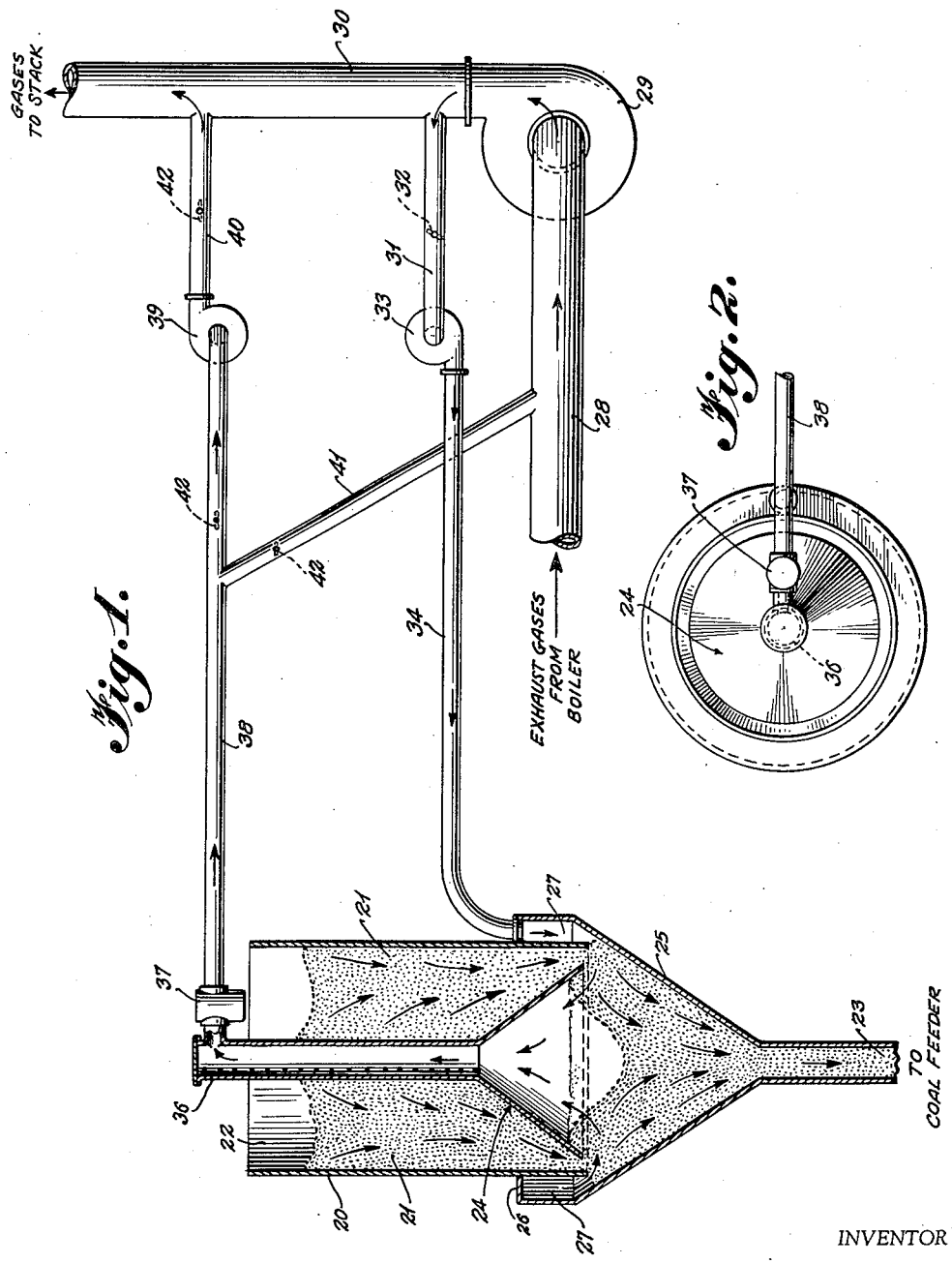

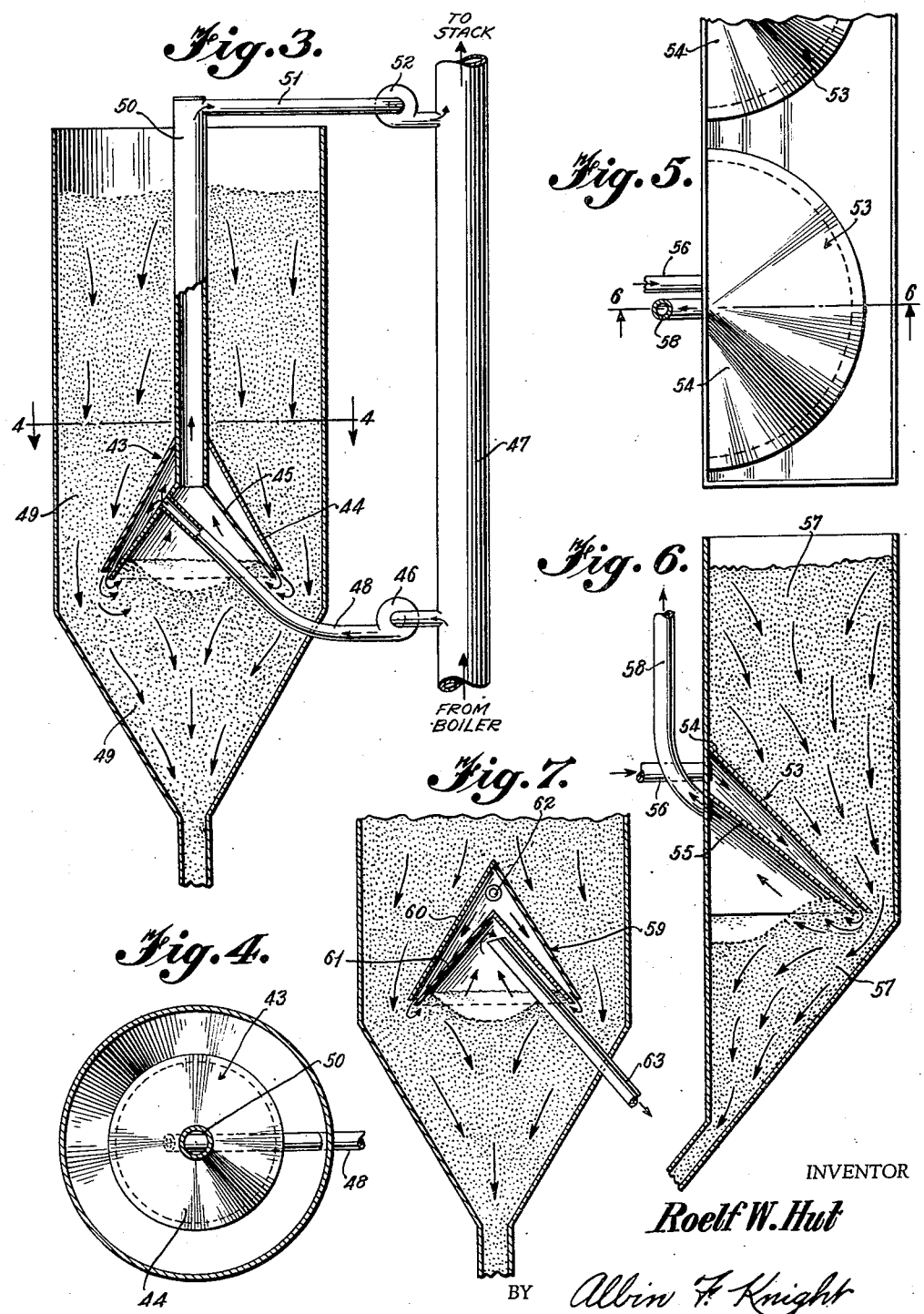

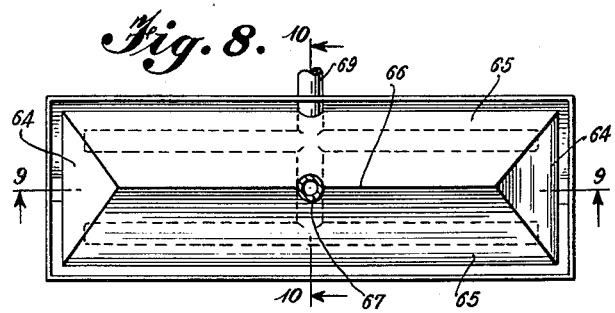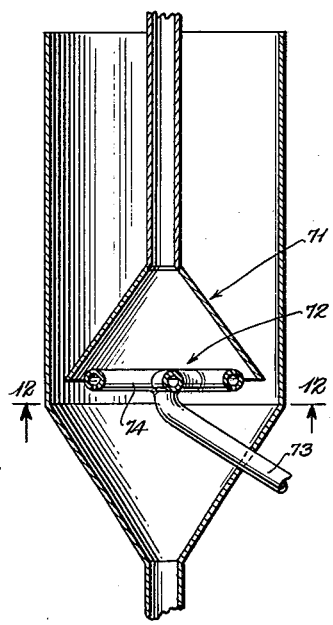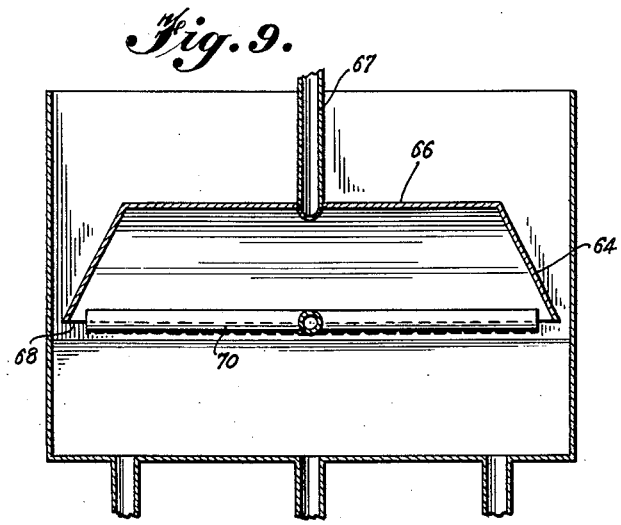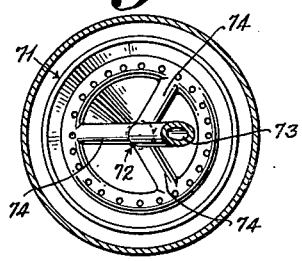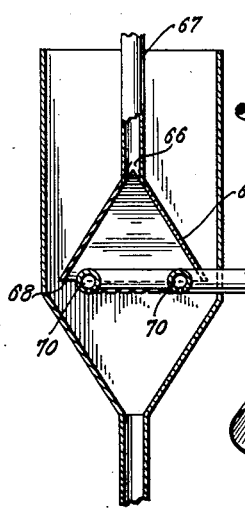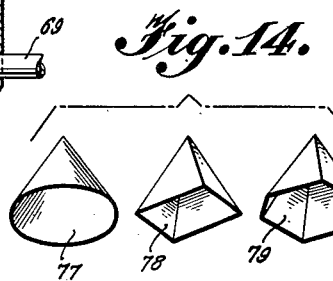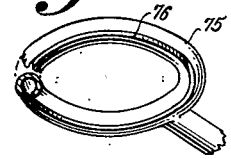

2,703,936
APPARATUS FOR FEEDING AND GUIDING COARSE SOLID MATERIALS

Roelf W. Hut, Morristown, Tenn.

Application November 13, 1951, Serial No. 256,109

7 Claims. (Cl. 34—168)

This invention relates to an apparatus for feeding coarse, solid materials such as coal into a pulverizer, furnace, etc. More particularly it relates to such an apparatus that includes means to prevent clogging of the material in the feed hopper or bunker.

When these materials are stored in a hopper the moisture binds many of the particles together into large lumps. In the case of coal in a feed hopper or bunker this presents a very serious problem. In the usual case the bunker is an upright container with an inlet for the coal at or near the top and a valved outlet of very small diameter compared to the inlet, the outlet of course being located at or near the bottom of the container. When the coal becomes wet it forms large lumps that will block the outlet. Then, too, arching occurs in the container. Arching is that phenomenon exhibited by wet coal or wet material which causes it to stick together when not moving. Normally, coal moves only from the top through the center of the container to the coal feeder pipe. The coal on the sides is not moving and has time to cement together, and will stop the flow of coal to a pulverizer or furnace. Also, the wet coal sticks to the walls of the pipes going to the feeder, pulverizer, etc. and builds up until it becomes a serious hazard.

It is therefore an object of this invention to provide apparatus which will prevent this lumping and clogging referred to above.

Broadly speaking, this invention provides an apparatus including baffle means within the container for the material which moves the material in substantially every part of the bunker and allows it no time to cement together.

Another object of this invention is the provision of a means of circulating a drying gas through the material in such a way that it will vaporize the moisture in the material and carry it off as entrained vapors to the outside of the container.

Other and further objects of this invention will become apparent from a description of the accompanying drawings wherein:

Figure 1 is partly an elevational view and partly a vertical cross sectional view of the apparatus constructed in accordance with this invention;

Figure 2 is a top plan view of the left hand portion of Figure 1;

Figure 3 is a simplified embodiment of Figures 1 and 2 and shows the apparatus of this invention in vertical cross section in part and an elevation in part;

Figure 4 is a view in horizontal section taken along the line 4—4 of Figure 3;

Figure 5 is a top plan view of still another embodiment of this invention;

Figure 6 is a view in vertical section taken along the line 6—6 of Figure 5;

Figure 7 is a fragmentary vertical cross section of another embodiment of the apparatus constructed in accordance with this invention;

Figure 8 is a top plan view of another embodiment of this invention;

Figure 9 is a view taken along the line 9—9 of Figure 8;

Figure 10 is a vertical cross section of the embodiment shown in Figures 8 and 9;

Figure 11 is a vertical cross section of another embodiment of this invention;

Figure 12 is a view taken along line 12—12 of Figure 11;

Figure 13 is a perspective view of modified type of distribution head according to this invention, and Figure 14 is a perspective view of baffles constructed according to this invention.

Referring to Figures 1 and 2, there is illustrated therein one particular type of baffle means and one scheme for introducing the drying gas. A bunker, feed hopper or container 20 receives material such as coal 21 in its top inlet 22. The coal gravitates downwardly to an outlet 23. Baffle means generally designated by the numeral 24, presents a tortuous path to the coal as it passes from the inlet 22 to the outlet 23. In this particular embodiment, the baffle means 24 is a downwardly divergently sloping single-walled member having a conical surface exposed to the moving coal. A funnel-shaped member 25 is positioned at the bottom of the container 20, so as to surround the said bottom but to be spaced therefrom. By sealing the top of the funnel member to the container by any sealing means 26 a gas chamber 27 is formed. Into this chamber, through an opening in the seal, is introduced the drying gas.

Broadly speaking, this drying gas may be any gas capable of taking up the moisture in the coal, without, of course, doing any damage to the coal. Hot dry air is a good example. In the embodiment of Figures 1 and 2, exhaust gas from the boiler is used. This gas is pulled from the boiler through pipe 28 by exhaust fan 29 and then guided out the exhaust stack by pipe 30. However, some of the gas travels through the pipe 31 past valve 32 into the booster fan 33, through pipe 34 and into the gas chamber 27.

After the drying gas has been admitted to the gas chamber it travels into the material at a point below the baffle means 24. Having passed through the material and in so doing absorbing the moisture therein, the gas is collected by the baffle means 24. At the top of the baffle means is an outlet conduit 36 positioned at the apex of the conical surface. The gas travels up this conduit through a dust separator 37 and out pipe 38. An exhaust fan or booster fan 39 pulls the gas through this pipe 38 and forces it through pipe 40 into pipe 30 where it is carried to the stack. Pipe 41 is provided to re-circulate the gas through the bunker without the use of the booster fans. For this purpose valve 42 is provided to divert the path of flow into pipe 41.

Although the embodiment shown in Figures 1 and 2 can be used with a high degree of efficiency, probably from a practical standpoint, the form disclosed in Figures 3 and 4 is preferable for commercial use. In this simplified form of the invention, the upper portion of the container is defined by cylindrical walls which begin to taper off in the form of a conical funnel near the horizontal plane of the base of the baffle. The baffle means 43 in this embodiment is composed of two walls, a top wall 44 and a bottom wall 45, both of which are substantially coextensive in length. The drying gas is pulled by exhaust fan 46 from the pipe 47 and introduced between the walls by a conduit 48. The walls guide the gas downwardly so as to enter the material 49 below the baffle means. Again, after the gas has passed through this material it is collected by the baffle means. In this embodiment, an outlet conduit 50 extends vertically from the bottom wall 45 at the apex of the conical surface through the top wall 44 and then to the exterior of the container in the manner set forth in connection with the first embodiment referred to. A pipe 51 carries the gas through a fan 52 to the pipe 47.

Another embodiment similar to the one illustrated by Figures 3 and 4 is shown in Figures 5 and 6. The baffle means 53, and of course in this embodiment as in the others there may be more than one, is a downwardly sloping double wall device presenting a conical surface to the downwardly flowing material. Means such as conduit 56 are provided to introduce the drying gas between these walls. The walls guide the gas downwardly and inject it into the material 57 at a point below the baffle means. The bottom wall 55 collects the gas after it has passed through the materials and an outlet conduit 58 takes the gas away from the container. This outlet conduit is positioned adjacent the bottom wall 55 at a point near the apex of the conical surface.

Still another embodiment is illustrated in Figure 7. Here the baffle means 59 has a top wall 60 and a bottom wall 61. The drying gas is introduced between these walls through pipe 62. It passes downwardly into the material at a point below the baffle means. An outlet conduit 63 is provided to remove the gas from the container after it has passed through the material. This conduit 63 is positioned so as to have its intake end adjacent the bottom wall and near the apex of the conical surface.

In Figures 8 to 10, inclusive, is shown an embodiment whose baffle means is somewhat similar to that illustrated in Figures 1 and 2, in that it has a single wall downwardly sloping baffle. However, the means to introduce the drying gas is different, as is the shape of the surface of the baffle means which is exposed to the descending coal. This surface is downwardly sloping to a rectangular base. The four sides, 64 and 65 meet along line 66 to form a single wall downwardly sloping 4-sided prism. Centrally located in this baffle means is the outlet conduit 67 to carry away the gases to the exterior of the container.

The means to introduce the drying gas in this embodiment consists of a distribution head 68 fed by a pipe 69. The head consists in this particular embodiment of two parallel pipes 70 connected to the drying gas supply pipe 59. Pipes 70 have downwardly directed outlets therein to direct the gas into the material below the baffle.

Figures 11 and 12 illustrate the embodiment in which the baffle means 71 is the same as in Figures 1 and 2 but the distribution head 72 is somewhat different than that previously illustrated. It is fed by pipe 73 and is in the form of a ring with downwardly directed openings to direct the gas into the material. The ring is fed from the pipe 73 by pipes 74. Another type of distribution head is shown in Figure 13. It consists of a ring 75 having an annular slot or opening 76 therein which directs the gases downwardly into the material.

Figure 14 illustrates various baffle means such as a cone-shaped means 77, a 4-sided pyramid 78 and a 6-sided pyramid 79. All have downwardly sloping surfaces and all surfaces join at an apex.

In connection with these distribution heads it is of course possible to use any type of distribution head such as shown here, for instance, in combination with a conical prismatic of pyramidal baffle means.

Whereas the invention includes a drying system to facilitate the movement of coal and the like through storage bunkers, under some circumstances this may be dispensed with because it has been determined that the baffle means per se of the type shown will, under normal conditions, prevent stoppage of, or stagnant, coal in the chute portion of the bunker. The drying below the baffle does offer the advantage that it inhibits clogging of the coal in the pipe lines connected to the feeder, pulverizer, etc. However, it is essential to the proper operation of the invention that the cone guide be used when the drying is employed because otherwise drying stationary coal will increase the trouble. Therefore summing up, the baffle means can be used without the dryer but the dryer can not be used without the baffle means and additionally, the drying can be effected in various ways.

Whereas preferred embodiments of this invention have been described, other embodiments obvious from these teachings to those skilled in the art are also contemplated to be within the scope of the following claims.

What is claimed is:

1. Apparatus for feeding solid, coarse material including an upright container defining a flow zone for said material having an upper inlet and a lower outlet for said material that comprises a downwardly divergently sloping baffle means in said container including two vertically spaced substantially coextensive walls, having conical surfaces generated about a common axis, said baffle means lying between said inlet and said outlet, means to introduce a drying gas between said walls whereby said gas flows downwardly between said walls to enter said material at a point below and between the bottom edges of said baffle means, and an outlet gas conduit in communication with the top underside of the bottom wall of said baffle means to conduct said gas away from said container after it has passed through said material.

2. Apparatus for feeding solid, coarse material including an upright container defining a flow zone for said material having an upper inlet and a lower outlet for said material that comprises a downwardly divergently sloping baffle means in said container including two vertically spaced substantially coextensive walls, having conical surfaces generated about a common axis, said baffle means lying between said inlet and said outlet, means to introduce a drying gas between said walls whereby said gas flows downwardly between said walls to enter said material at a point below and between the bottom edges of said baffle means, and a gas outlet conduit positioned adjacent the bottom wall of said baffle means near the apex of said conical surface to conduct said gas away from said container after it has passed through said material.

3. Apparatus for feeding solid, coarse material including an upright container defining a flow zone for said material having an upper inlet and a lower outlet for said material that comprises a downwardly divergently sloping baffle means in said container including two vertically spaced substantially coextensive walls, having conical surfaces generated about a common axis, said baffle means lying between said inlet and said outlet, means to introduce a drying gas between said walls whereby said gas flows downwardly between said walls to enter said material at a point below and between the bottom edges of said baffle means, and a gas outlet conduit extending vertically from the bottom wall of said baffle means at the apex of said conical surface through the top wall of said baffle means and to the exterior of said container to conduct said gas away from said container after it has passed through said material.

4. Apparatus for feeding coarse, solid material including an upright container defining a flow zone for said material having an upper inlet and a lower outlet for said material that comprises a single-walled downwardly divergently sloping baffle means in said container having a prismatic surface between said inlet and said outlet, a distribution head positioned within said baffle means near the bottom thereof, said head including a plurality of downwardly directed outlets therein, means to introduce a drying gas to said distribution head whereby said gas is directed into the flow zone of said container, and a gas outlet conduit extending vertically from the top of said baffle means to conduct said gas away from said container after it has passed through said material.

5. Apparatus for feeding coarse, solid material including an upright container defining a flow zone for said material having an upper inlet and a lower outlet for said material that comprises a single-walled downwardly divergently sloping baffle means in said container between said inlet and said outlet, a distribution head positioned within said baffle means near the bottom thereof, said head including a plurality of downwardly directed outlets therein, means to introduce a drying gas to said distribution head whereby said gas is directed into the flow zone of said container, and a gas outlet conduit extending vertically from the top of said baffle means to conduct said gas away from said container after it has passed through said material.

6. Apparatus for feeding coarse, solid material including an upright container defining a flow zone for said material having an upper inlet and a lower outlet for said material that comprises a single-walled downwardly divergently sloping baffle means having a pyramidal surface in said container between said inlet and said outlet, a distribution head positioned within said baffle means near the bottom thereof, said head including a plurality of downwardly directed outlets therein, means to introduce a drying gas to said distribution head whereby said gas is directed into said flow zone of said container, and a gas outlet conduit extending vertically from the top of said baffle means to conduct said gas away from said container after it has passed through said material.

7. An apparatus for feeding solid, coarse material by gravity flow including a container having a material inlet and a material outlet; downwardly divergently sloping baffle means centrally positioned within the walls of said container and defining with the walls of said container a space decreasing in the direction of material flow and terminating in a restricted flow passage circumventing the terminus of said baffle means; a gas inlet means; means positioned within the divergent portion of said baffle means to direct the flow of gas into said flow passage from said gas inlet means; and a gas outlet means in communication with the space bounded by said baffle means, to conduct said gas away from said container after it has passed through said material at said flow passage.

References Cited in the file of this patent

UNITED STATES PATENTS

| | | |
|---|---|---|
| 516,114 | Riley | Mar. 6, 1894 |
| 571,382 | Mayer | Nov. 17, 1896 |
| 1,623,553 | Randolph | Apr. 5, 1927 |
| 1,910,793 | Guinan | May 23, 1933 |
| 2,072,492 | Anger | Mar. 2, 1937 |
| 2,245,664 | Gronert | June 17, 1941 |
| 2,299,299 | Bills | Oct. 20, 1042 |
| 2,400,194 | Day et al. | May 14, 1946 |
| 2,429,980 | Allinson | Nov. 4, 1947 |
| 2,444,128 | Anderson | June 29, 1948 |

FOREIGN PATENTS

| | | |
|---|---|---|
| 424,801 | Great Britain | Feb. 28, 1935 |